(12) United States Patent  (10) Patent No.: US 8,444,154 B2
Schmitt et al.  (45) Date of Patent: May 21, 2013

(54) METAL CYLINDER HEAD GASKET WITHOUT A SPACING LAYER

(75) Inventors: Klaus Schmitt, Grunebach (DE); Ralf Flemming, Langenbach (DE)

(73) Assignee: Federal-Mogul Sealing Systems GmbH, Herdorf (DE)

( * ) Notice: Subject to any disclaimer, the term of this patent is extended or adjusted under 35 U.S.C. 154(b) by 0 days.

(21) Appl. No.: 13/413,997

(22) Filed: Mar. 7, 2012

(65) Prior Publication Data
US 2012/0228835 A1 Sep. 13, 2012

Related U.S. Application Data

(62) Division of application No. 10/583,535, filed as application No. PCT/EP2004/010628 on Sep. 22, 2004, now Pat. No. 8,382,123.

(30) Foreign Application Priority Data

Dec. 16, 2003 (DE) .................. 103 58 919

(51) Int. Cl.
*F02F 11/00* (2006.01)
(52) U.S. Cl.
USPC .......................... 277/594; 277/593
(58) Field of Classification Search
USPC .............................. 277/590–595
See application file for complete search history.

(56) References Cited

U.S. PATENT DOCUMENTS

| 4,759,585 | A | 7/1988 | Udagawa |
| 5,549,307 | A | 8/1996 | Capretta et al. |
| 7,131,649 | B2 | 11/2006 | Sueda |
| 7,213,813 | B2 | 5/2007 | Sueda |
| 7,793,943 | B2 | 9/2010 | Sueda |
| 2002/0014744 | A1* | 2/2002 | Udagawa ................ 277/592 |
| 2002/0014745 | A1* | 2/2002 | Miyaoh et al. ............ 277/592 |
| 2008/0042371 | A1 | 2/2008 | Flemming |

FOREIGN PATENT DOCUMENTS

DE 100 29 352 A1 12/2001
EP 1 180 621 A2 2/2002

* cited by examiner

*Primary Examiner* — Thomas Beach
*Assistant Examiner* — Gilbert Lee
(74) *Attorney, Agent, or Firm* — Robert L. Stearns; Dickinson Wright, PLLC

(57) ABSTRACT

One aspect of the invention relates to a cylinder head gasket provided with at least one opening corresponding to a combustion chamber of an internal combustion engine. The gasket has a function layer with a full bead and an annular support with a bead. The bead of the annular support is arranged on the side of the full bead which is oriented away from the combustion chamber. Another aspect of the invention relates to a cylinder head gasket having an upper functional layer, an annular support and a lower functional layer. The annular support is arranged between the upper and lower functional layers and is adjacent to the lower functional layer. The upper functional layer comprises one full bead, and the lower functional layer has a bead arranged on the side of the full bead which is oriented away from the combustion chamber.

8 Claims, 3 Drawing Sheets

METAL CYLINDER HEAD GASKET WITHOUT A SPACING LAYER

CROSS REFERENCE TO RELATED APPLICATIONS

This application is a divisional application which claims priority to U.S. application Ser. No. 10/583,535, filed Jun. 3, 2009, PCT Application Serial No. PCT/EP2004/010628, filed Sep. 22, 2004, and German Patent Application No. 103 58 919.8, filed Dec. 16, 2003, all of which are incorporated herein by reference.

BACKGROUND OF THE INVENTION

1. Field of the Invention

The present invention relates to a metallic cylinder head gasket without a spacing layer. In particular, it concerns a cylinder head gasket with only one functional layer.

2. Related Art

A cylinder head gasket ensures impermeability to gas between the cylinder block and cylinder head. Thereby, the cylinder head gasket must balance elastic vibrations between the cylinder head and cylinder block.

The functional principle of metallic gaskets for cylinder head use in internal combustion engines is that an elastic sealing zone is present. The gasket is designed with beads, which form elastic sealing zones around the area of the combustion chamber. The pressure of the bead adjusts constantly in the operation of the engine based upon the varying stress. The strength of the material layer and also the particular molding of the bead has influence on the elastic properties of the bead, i.e. the elasticity or spring stiffness. The corresponding stress-strain characteristics can only be varied over a narrow area. The area of such a gasket directly surrounding the combustion chamber is exposed to higher stresses during the operation of the engine. To guarantee an adequate sealing in these exposed areas it is necessary to apply a high surface pressure. This is usually achieved by increasing the material strength at the boundary of the combustion chamber, and can be effected by the crimping of a metal layer or by the use of additional layers which are joined with a metal layer of the gasket. Frequently this thickness of material is arranged so that the beads are protected beforehand in the built-in state, to be completely flattened by the pressure.

Cylinder head gaskets usually consist of several layers and also an annular support designated as a stopper. For the increase of pressure in the areas intensely affected, the beads are provided around the combustion chamber, which increases the material thickness.

DE 101 01 604 A1 describes a cylinder head gasket with two sealing layers, one a spacing layer and one an annular support. With this gasket, the main bead is provided with additional supporting beads in the sealing layer, near the combustion chamber.

DE 100 29 352 A1 discloses a gasket in which a metal ring is welded to a metal layer along a welding bead, so that the metal ring and metal layer are kept in a spaced apart relationship to one another. While this gasket has a high impermeability to gas for reason of the welding, the elasticity is reduced due to the firm connection and fixed spacing.

DE 197 51 293 A1 describes a gasket in which a turned-over fold constitutes a pressure confinement for the bead. Thereby, it forms an area of higher pressure. But here the bead is held in indirect force closure, so that the maximum pressure occurs not in the area of the bead, but in the area of the crimping. This sealing principle is followed for diesel engines.

As a rule, a varying construction is used with gasoline engines of passenger cars, whereby the pressure on a boundary is eliminated. Here, the combustion chamber is surrounded only by the beads of the cylinder head gasket, which are flattened in the built-in state. The beads lie here in a direct force fit and thereby receive the maximum pressure.

In this location an uncoiling with great oscillation amplitude takes place with stress, that is, upon impact of pressure through the combustion passage into the combustion chamber. With a conventional gasket it progresses to strong vertical oscillations. Nevertheless, in order for an adequate impermeability to gas to be ensured, a high pressure is generated against the bead. If the bead positioned in direct force fit is not supported, and thus endures the entire stress, the lifetime of the gasket is thereby negatively influenced.

In EP 0574166 B1 a combination of both forms of construction is disclosed. A gasket is described which includes a support ring, which in the built-in state reaches up to full bead of the sealing layer. In this arrangement the bead lies in direct force fit. This arrangement is particularly suitable for engines in which the bridge width between individual combustion chambers is small, and a concentration of the maximum pressure upon the area bordering the combustion chamber is possible.

This support ring follows in its form the profile of the bead, and does not outreach the crest of the bead. Thereby, the spring characteristic of the bead is influenced such that the bead becomes harder and also loses elasticity. In the built-in state an extreme pressure peak also prevails in the area of the crest of the bead. In comparison with a bended beam construction, the support ring, to all intents and purposes, constitutes the support point. With the impact of pressure an uncoiling effect over the crest of the bead develops, which leads to high oscillation amplitudes in the vertical direction. This effect can intensify, depending upon pressure in the combustion chamber.

A support ring designated as a stopper serves to enlarge the material thickness in the area of the bead and thereby the pressure is raised at the most stressed positions of the gasket.

The more layers are used, the more complex and therefore the more expensive the manufacture of a corresponding cylinder gasket head will become. The adjustment of the different layers to one another, and the possible different temperature dependent expansions signify a potential deterioration of the sealing properties and lifetime of the corresponding gasket.

SUMMARY OF THE INVENTION

It is the goal of the present invention to provide a cylinder head gasket with which the uncoiling effect can be reduced. Another object is to provide a cylinder head gasket which has only one functional layer.

According to a first aspect of the present invention, a metallic cylinder head gasket with at least one through-hole corresponding to a combustion chamber of an internal combustion engine is provided. The gasket comprises one functional layer and one support ring, whereby the support ring is arranged around the through-hole. The functional layer comprises one full bead. The support ring has a full bead on which the functional layer rests, and also a bead, which is arranged behind the full bead when viewed in the radial direction of the opening for the combustion chamber. This additional bead receives a portion of the pressure which is in effect in the built-in state of the cylinder head gasket.

It is preferred that the bead be implemented as a half bead. This may be a desirable option in order to bring a certain surface into contact with the bead. Moreover, the elasticity of the bead when formed as a full bead as compared with that of a half bead, can be adjusted.

It is preferred that the support ring extend from one bead foot at least up to the other bead foot of the full bead. Thereby, the full bead lies in a direct force fit.

According to another aspect of the invention, a metallic cylinder head gasket with at least one through-hole corresponding to the combustion chamber of an internal combustion engine is provided. The gasket comprises an upper functional layer, a support ring and a lower functional layer. The support ring is between the upper and lower functional layers, and is arranged around the opening. The upper functional layer comprises a full bead. The lower functional layer comprises a bead, which is arranged behind the full bead when viewed in the radial direction from the opening for the combustion chamber. The additional bead receives a portion of the pressure which is in effect in the built-in state of the cylinder head gasket.

It is preferred that the bead be implemented as a half bead. The advantages of this embodiment have already been mentioned.

It is preferred that the half bead be constructed as directed above. Depending upon the alignment, another surface can come into contact with the appropriate layer. This can affect the properties of the gasket in desirable ways.

It is preferred that the half bead be formed downwards in direction. It is preferred that the bead be implemented as a full bead. The advantages of this embodiment have already been mentioned.

It is preferred that the full bead be formed upwards in direction.

It is preferred that the full bead be formed downwards in direction.

It is preferred that the support ring extend from one bead foot at least up to the other bead foot of the full bead. Thereby, the full bead lies in a direct force fit.

It is preferred that the support ring extend at least from the bead foot of the full bead, which is next to the combustion chamber, up to the bead foot of the bead, which is next to the combustion chamber. Thereby, a higher rigidity of the gasket is achieved, and the pressure distributes over a larger surface.

In the present invention an additional bead is provided in radial direction behind the combustion chamber. This bead, which can be implemented as a half bead or a full bead, accepts a portion of the pressure. Since the bead situated next to the combustion chamber must not accept the entire stress any longer, the bead tip and/or contact tip can be optimized in the pressure. Likewise, the second bead accepts an additional sealing function. These properties improve the sealing properties and have a positive influence on the lifetime of the cylinder head gasket.

DETAILED DESCRIPTION OF THE ENABLING EMBODIMENTS

On the left side of each figure one finds the area adjacent to the combustion chamber of the cylinder head gasket, while on the right side of each figure is the side oriented away from the combustion chamber.

Figure 1A:
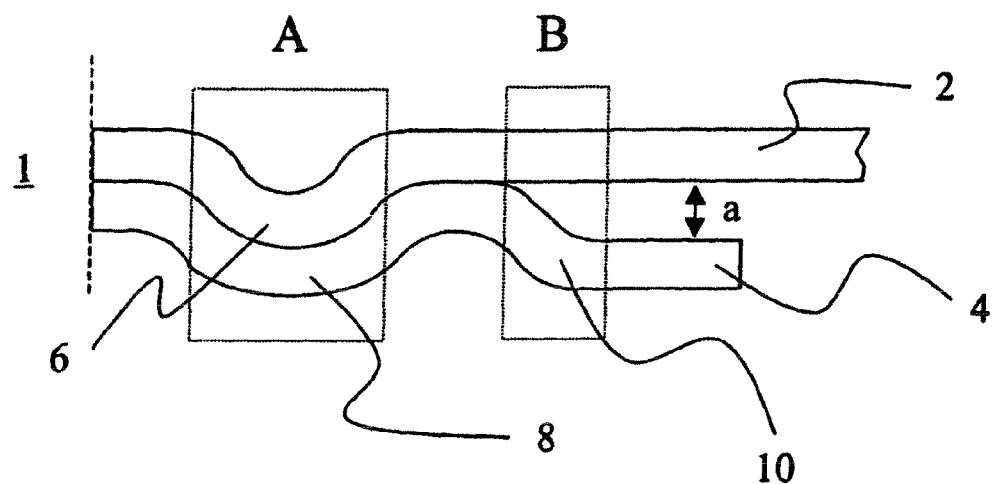
FIGS. 1a and 1b show two preferred embodiments of a cylinder head gasket according to the invention having one functional layer, in a cross-sectional view.

The bead also rests upon the support ring and/or stopper. This principle is therefore designated as "bead on stopper". In FIG. 1a a cylinder head gasket is shown, which comprises a functional layer 2 and a ring lining 4. The functional layer 2 comprises a full bead 6. The ring lining 4 comprises a full bead 8, in which rests the full bead 6, and a half bead 10 lying behind it as viewed in radial direction from the combustion chamber. In the area designated as A, in which the full bead 6 of the functional layer 2 rests upon the ring lining 4, occurs the greatest pressure in the built-in state. A portion of the pressure arising is absorbed by the half bead 10 of the ring lining 4 in the area designated as B, whereby the full bead 6 is relieved. Thereby, an additional support is also created. The full bead 6 of the functional layer lies upon the support ring and thus is in direct force contact. The support point of the full bead 6 is also, for all intents and purposes, the support point of a bended-beam construction.

Figure 1B:
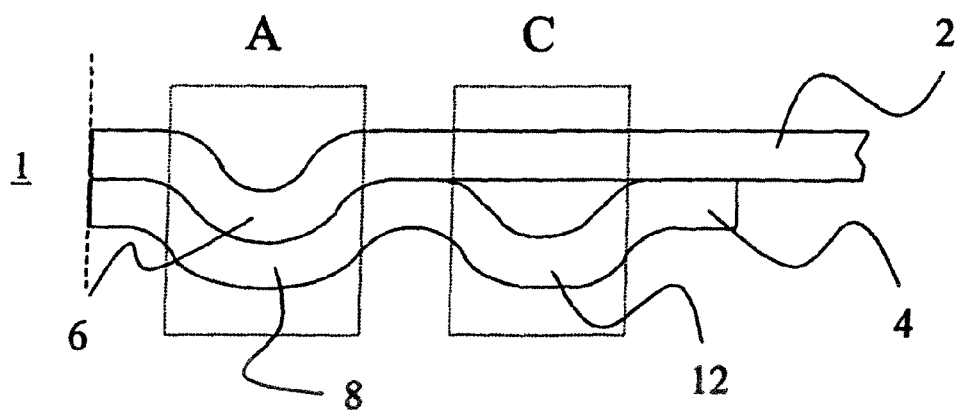

In FIG. 1b a modification of the cylinder head gasket is shown. But here, instead of the half bead 10 another full bead 12 is formed. In comparison with the situation shown in FIG. 1a, here a portion of the pressure in Area C is absorbed by the additional bead. The design of the additional bead as full bead 12 as shown here or as shown in FIG. 1a as a half bead enables adjustment of the elastic properties of the cylinder head gasket of the invention in the area of the additional bead. Thereby, influence is also possible as to which surface the ring support behind this area will directly rest upon, which here are either the functional layer or as in FIG. 1 the upper side of the cylinder block (not shown).

Figure 2A:
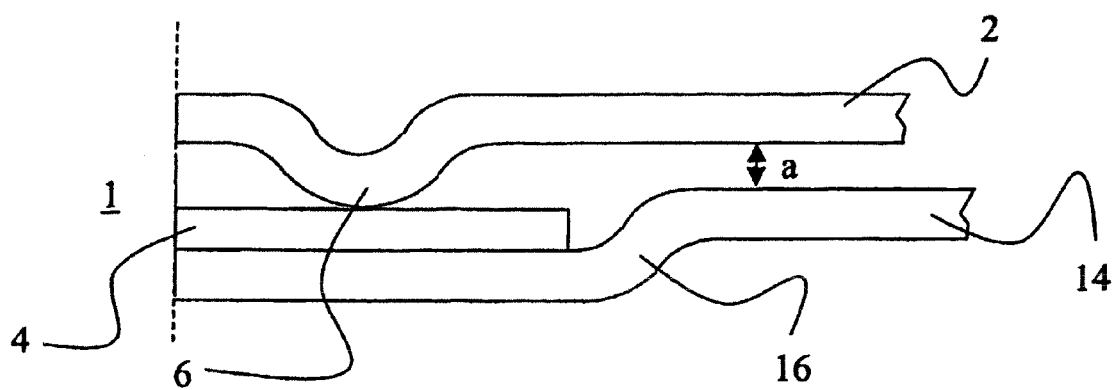
FIGS. 2a and 2b show preferred embodiments of a multi-layered cylinder head gasket according to the invention in a cross-sectional view.

In FIG. 2a a multi-layered cylinder head gasket is shown, comprising an upper functional layer 2, a support ring 4 and a lower functional layer 14. The upper functional layer 2 comprises a full bead 6, which rests upon ring support 4. The lower functional layer 14 comprises a half bead 16 lying behind it when viewed in a radial direction from the combustion chamber. The half bead 16 is formed in the upward direction. Support ring 4 extends from the bead foot of the full bead 6, which is next to the combustion chamber, up to the bead foot of half bead 16, which is next to the combustion chamber (in the figure, respectively, on the left side).

Figure 2B:
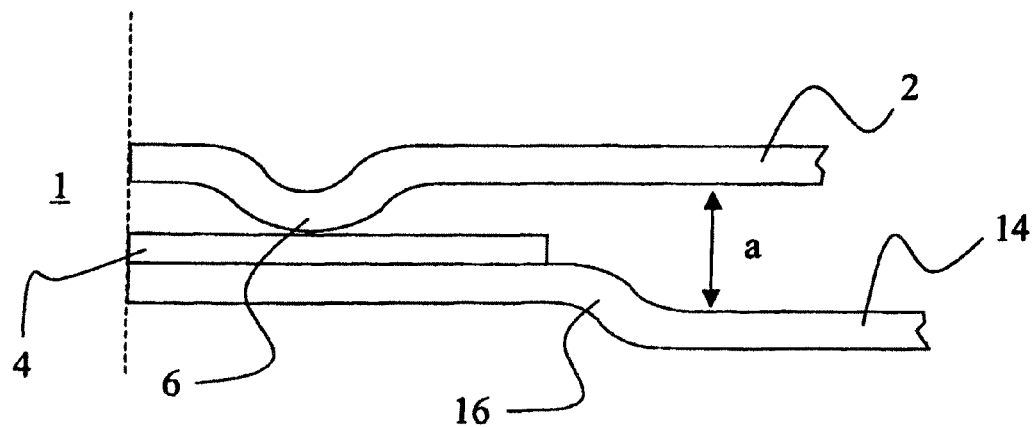

FIG. 2b displays a modification of the cylinder head gasket of FIG. 2a, in which the half bead 16 is directed downward of lower functional layer 14.

Figure 3A:
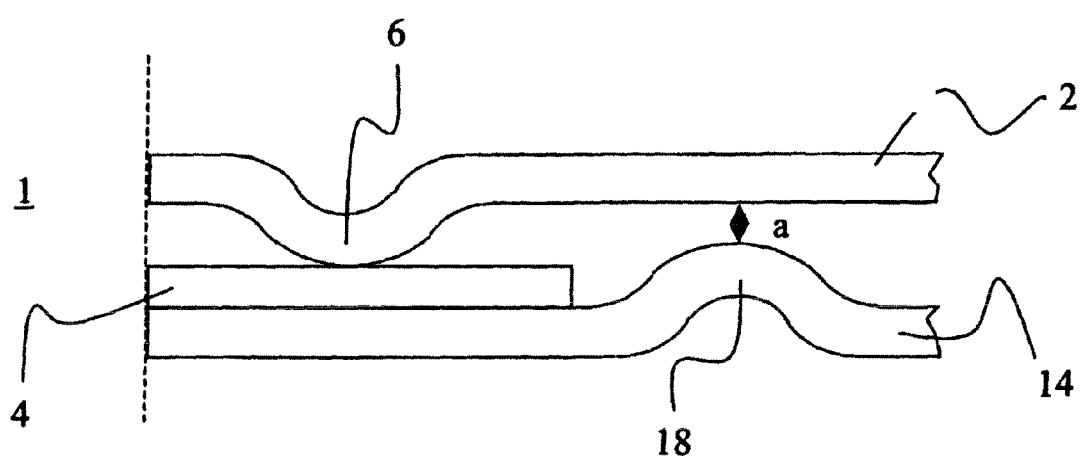
FIGS. 3a and 3b show other preferred embodiments of a multi-layered cylinder head gasket according to the invention in a cross-sectional view.
Figure 3B:
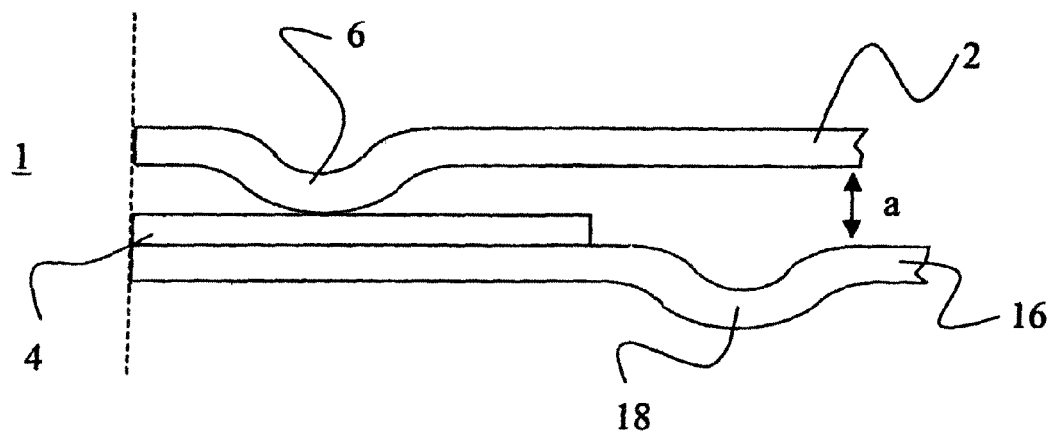

FIGS. 3a and 3b exhibit respective embodiments of a multi-layered cylinder head gasket according to the invention. In contrast to FIGS. 2a and 2b the lower functional layer 14 comprises a full bead 18 instead of a half bead. FIG. 3a displays an embodiment in which full bead 18 is directed upward, and FIG. 3b is another embodiment in which full bead 18 is formed downward.

What is claimed is:

1. A metallic cylinder head gasket with at least one opening corresponding to a combustion chamber of an internal combustion engine, comprising an upper functional layer, a support ring and a lower functional layer, wherein said support ring is arranged between said upper functional layer and said lower functional layer and is adjacent to said lower functional layer, said upper functional layer includes a full bead which is adjacent to said support ring, and said lower functional layer including at least one further bead which is arranged on the side of the full bead oriented away from the said at least said one opening corresponding to the combustion chamber, wherein said at least one further bead comprises a half bead, wherein said half bead is so formed, that said lower functional layer lies on the side of said half bead oriented away from said at least said one opening corresponding to the combustion chamber on a level higher than on the side of said half bead oriented towards said at least said one opening corresponding to the combustion chamber.

2. Cylinder head gasket according to claim 1, wherein said lower functional layer on the side of said half bead oriented away from said at least said one opening corresponding to the combustion chamber is spaced at a predetermined distance from said upper functional layer.

3. Cylinder head gasket according to claim 1, wherein said half bead is so formed, that it is equal in height to said support ring.

4. Cylinder head gasket according to claim 1, wherein said support ring extends from a bead foot of said full bead of said upper functional layer oriented towards said at least one opening corresponding to the combustion chamber up to a bead foot of said at least one further bead oriented towards said at least one opening corresponding to the combustion chamber.

5. A metallic cylinder head gasket with at least one opening corresponding to a combustion chamber of an internal combustion engine, comprising an upper functional layer, a support ring and a lower functional layer, wherein said support ring is arranged between said upper functional layer and said lower functional layer and is adjacent to said lower functional layer, said upper functional layer includes a full bead which is adjacent to said support ring, and said lower functional layer including at least one further bead which is arranged on the side of the full bead oriented away from the said at least said one opening corresponding to the combustion chamber, wherein said at least one further bead comprises a full bead, wherein said lower functional layer is spaced at a predetermined distance from said upper functional layer, and wherein said support ring extends from a bead foot of said full bead of said upper functional layer oriented towards said at least one opening corresponding to the combustion chamber up to and ends at a bead foot of said at least one further bead oriented towards said at least one opening corresponding to the combustion chamber.

6. Cylinder head gasket according to claim 5, wherein said further bead in form of said full bead is so formed, that said lower functional layer lies on the side of said further bead in form of said full bead oriented away from said at least said one opening corresponding to the combustion chamber on the same level as on the side oriented towards said at least said one opening corresponding to the combustion chamber.

7. Cylinder head gasket according to claim 5, wherein a tip of said full bead is directed downwards.

8. Cylinder head gasket according to claim 5, wherein a tip of said full bead is directed upwards.

\* \* \* \* \*